Patented Sept. 25, 1945

2,385,747

UNITED STATES PATENT OFFICE

2,385,747
POLYMETHINE DYESTUFFS AND PROCESS OF PREPARING THEM

Hans von Freyberg and Heinrich Koch, Frankfort-on-the-Main, Germany, assignors to General Aniline & Film Corporation, New York, N. Y., a corporation of Delaware No Drawing. Application July 24, 1940, Serial No. 347,302. In Germany August 17, 1939

2 Claims. (Cl. 260—240)

The present invention relates to the preparation of new polymethine dyestuffs of valuable properties, more particularly it relates to polymethine dyestuffs which are prepared by condensing a compound containing a reactive methylene group with a paradialkylaminophenyl aldehyde of the general formula:

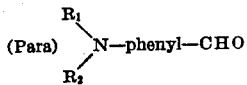

wherein $R_1$ and $R_2$ represent alkyl radicals the total number of the carbon atoms of both alkyl radicals being together at least 7 and not more than 10, and wherein the phenyl radical may contain substituents.

The new dyestuffs thus obtained have the general formula

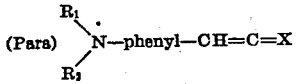

wherein $R_1$ and $R_2$ stand for alkyl radicals the total number of the carbon atoms of both alkyl radicals being together at least 7 and not more than 10, the grouping =C=X stands for the radical of a compound containing a reactive methylene group, in which the =C= portion is formed from the reactive methylene group and wherein the phenyl radical may contain substituents.

By the term "reactive methylene group," a methylene group is to be understood which will condense with one aldehyde group by splitting off water, with the formation of a carbon-carbon double linkage.

As suitable compounds with reactive methylene groups there may be mentioned, for example, derivatives of cyanacetic acid, such as their esters, ethers and amides, derivatives of malonic acid such as malonic nitrile, malonic ester or the like, pyrazolones, indolines, oxindoles and the like.

The new dyestuffs are distinguished by a number of improved fastness properties in comparison with analogous polymethine dyestuffs hitherto known.

They go on to the fiber in an excellent manner and possess an improved fastness to water, washing and to light. They are particularly suitable for dyeings on acetate silk. Thus, for instance, the dyestuff obtained according to the present invention by condensing para-N-butyl-isobutyl-aminobenzaldehyde and cyanacetic acid ethyl ester has an improved fastness to water over the known dyestuff from para-dimethylaminobenzaldehyde and cyanacetic acid ethyl ester and an improved affinity for acetate silk in comparison with the known dyestuff from para-butyl-beta-chloroethyl-aminobenzaldehyde and cyanacetic acid ethyl ester.

The new dyestuffs are also suitable for dyeing mordanted, for instance tanned cotton. Some of the new dyestuffs may be transformed into fast lakes by means of complex phosphotungstic acids.

The following examples serve to illustrate the invention, but they are not intended to limit it thereto, the parts being by weight:

1. 114 parts of cyanacetic acid ethyl ester are heated to boiling for several hours with 235 parts of para-N-butyl-isobutyl-aminobenzaldehyde boiling between 177° C. and 179° C. under a pressure of 1.7 mm. (obtainable according to known processes by causing N-butylisobutylaniline to react with methylformanilide and phosphorus oxychloride) in 400 parts of alcohol, while adding 0.4 part of piperidine until the formation of the dyestuff is complete. The alcohol is then distilled off; after some time the dyestuff crystallizes in the form of brown-yellow crystal druses melting at 51° C. to 53° C.

The dyestuff has the following formula:

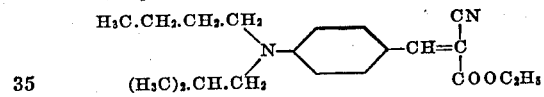

It dyes cellulose esters and cellulose ethers very clear greenish-yellow tints. It possesses an excellent affinity for acetate silk fiber, very good fastness to wet processing and a very good fastness to light.

The N-butyl-isobutylaniline may be prepared in known manner, cf., "Zentralblatt" 1926, II, page 391, "Berichte der deutschen chemischen Gesellschaft," page 1202 et seq. It boils at 142° C. under a pressure of 11 mm.

2. 100 parts of cyanacetic acid methyl ester are heated to boiling for several hours with 235 parts of para-N-methyl-isoheptylaminobenzaldehyde boiling under a pressure of 1.4 mm. at a temperature of 175° to 180° C. (obtainable in a manner analogous to that described in Example 1) in 400 parts of methanol, while adding 0.4 part of piperidine. When the formation of the dyestuff has ceased the whole is distilled with steam until the methanol and the piperidine are expelled. The dyestuff which is insoluble in water is separated. It dyes cellulose esters and cellulose ethers very clear greenish-yellow tints, possesses an excellent affinity for the fiber and very good fastness properties. The dyestuff has the following formula:

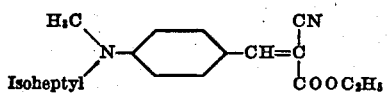

The base which is necessary for the preparation of the aldehyde was prepared, according to known processes, from isoheptyl-alcohol, aniline and hydrochloric acid and by methylating the monoisoheptylaniline obtained. It boils at 120° C. under a pressure of 17 mm.

3. 66 parts of malonic acid dinitrile are heated to boiling for several hours with 247 parts of para-N-methyl-iso-octyl - amino - benzaldehyde boiling at a temperature between 187° C. and 194° C. (prepared in a manner analogous to that described in Example 1) in 300 parts of alcohol, while adding 0.3 part of piperidine. When the formation of the dyestuff is complete the whole is distilled with steam until alcohol and piperidine have passed over. The dyestuff is filtered with suction. It has a very good affinity for cellulose esters and cellulose ethers which are dyed bright yellow tints and possesses very good fastness properties. It has the formula:

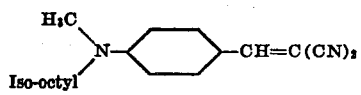

The methyl-iso-octyl-aniline necessary for the preparation of the aldehyde was produced by known processes from methylaniline and iso-octyl-bromide. It boils at a temperature of 112° C. to 114° C. under a pressure of 1.3 mm.

4. 147 parts of N-methyloxindole are heated to boiling for several hours with 247 parts of para-N-methyl-iso-octyl-aminobenzaldehyde in 500 parts of alcohol, while adding 0.5 part of piperidine. When the formation of the dyestuff has ceased the alcohol is distilled off. The dyestuff separates in the form of crystals. It has a very good affinity for cellulose esters and cellulose ethers which are dyed reddish-yellow tints and is distinguished by an excellent fastness to wet processing. The dyestuff has the formula:

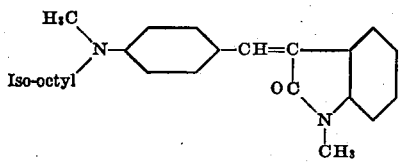

5. 173 parts of 1.3.3-trimethyl-2-methyleneindoline and 310 parts of para-N-iso-octyl-beta-chloro-ethylamino-ortho-tolylaldehyde (a non-distillable yellow oil which may be prepared in a manner analogous to that described in Example 1) are heated for several hours at 70° C. to 80° C. in 750 parts of glacial acetic acid. When the formation of the dyestuff is complete the dyestuff solution is added to concentrated hydrochloric acid and salted out with sodium chloride solution. When dried, the dyestuff forms scales having a bronze lustre. It dyes cellulose esters and cellulose ethers very brilliant red-violet tints and is especially distinguished by an excellent fastness to wet processing. It has the following formula:

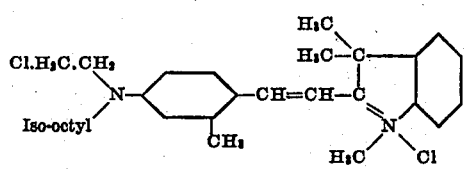

The iso-octyl-oxethyl-meta-toluidine necessary for the preparation of the aldehyde was prepared, according to known processes, from meta-toluidine and iso-octyl-bromide and treating under pressure the mono-iso-octyl-meta-toluidine with ethylene oxide. It boils at a temperature between 157° C. to 165° C. under a pressure of 4 mm.

6. 203 parts of 5-methoxy-1.3.3-trimethyl-2-methyleneindoline and 234 parts of para-N-ethyl-isoamylamino-ortho-tolylaldehyde boiling at a temperature between 177° C. to 180° C. under a pressure of 3.4 mm. (prepared in a manner analogous to that described in Example 1) are heated to boiling for several hours in 700 parts of glacial acetic acid. When the dyestuff formation is complete the dyestuff solution is added to strong hydrochloric acid and salted out by means of a sodium chloride solution. After drying the dyestuff is obtained in the form of a resin having a bronze luster which readily dissolves in water and readily dyes cellulose esters and cellulose ethers red-violet tints. The dyestuff is distinguished by an excellent fastness to wet processing and by a very good fastness to light. It has the formula:

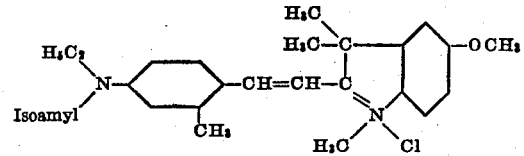

The base necessary for the preparation of the aldehyde was produced by known methods from ethyl-meta-toluidine and isoamylbromide. It boils at 134° C. under a pressure of 12 mm.

7. 173 parts of 1.3.3-trimethyl-2-methyleneindoline and 269 parts of para-N-methyl-iso-heptyl-amino-ortho-chlorobenzaldehyde boiling at a temperature between 190° C. and 196° C. under a pressure of 3 mm. (prepared in a manner analogous to that described in Example 1) are heated to 70° C. to 80° C. in 900 parts of glacial acetic acid until the formation of the dyestuff is complete. The solution of the dyestuff is then added to strong phosphoric acid and salted out with acid sodium phosphate. When dried the dyestuff forms a resin of a bronze luster which is readily soluble in water and dyes cellulose esters and cellulose ethers bluish-red tints having a very good fastness to wet processing. The dyestuff has the formula:

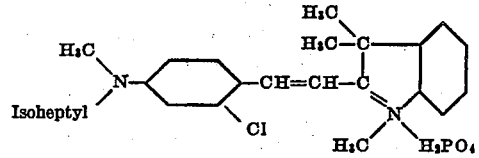

The base necessary for the production of the aldehyde was prepared, according to known processes, from meta-chloroaniline, isoheptyl alcohol and hydrochloric acid and by methylating the monoisoheptyl-meta-chloroaniline obtained. It boils at a temperature between 145° C. and 150° C. under a pressure of 2.5 mm.

We claim:

1. The dyestuffs of the formula

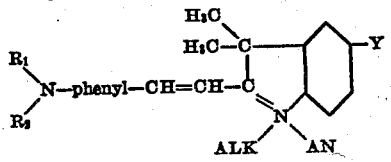

wherein $R_1$ is a member of the group consisting of methyl, ethyl, and chloroethyl groups; $R_2$ is a member of the group consisting of isoamyl, isooctyl, and isoheptyl groups; Y is a member of the group consisting of hydrogen and methoxy; AN means anion; and ALK means alkyl which dye acetate silk red-violet and bluish-red tints.

2. The dyestuff of the formula:

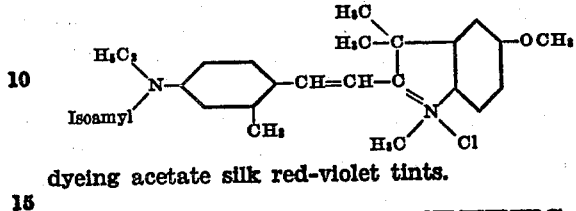

dyeing acetate silk red-violet tints.

HANS von FREYBERG.
HEINRICH KOCH.